United States Patent [19]

Winocur

[11] 4,215,936
[45] Aug. 5, 1980

[54] SHARED POINTING FOR OFFSET TARGET OF AN ADAPTIVE PHASED ARRAY

[75] Inventor: Joseph Winocur, Newport Beach, Calif.

[73] Assignee: Rockwell International Corporation, El Segundo, Calif.

[21] Appl. No.: 486,032

[22] Filed: Jul. 5, 1974

[51] Int. Cl.³ .......................... G01C 3/08; H04B 9/00; G01B 11/26
[52] U.S. Cl. ........................................ 356/5; 356/152; 455/615; 455/611
[58] Field of Search ............... 356/4, 5, 152; 250/199; 343/5 CM; 455/615, 611

[56] References Cited

U.S. PATENT DOCUMENTS

| | | | |
|---|---|---|---|
| 3,346,738 | 10/1967 | Rogers et al. | 356/141 |
| 3,644,043 | 2/1973 | Jones et al. | 356/5 |
| 3,731,103 | 5/1973 | O'Meara | 356/5 |
| 3,760,418 | 9/1973 | Cash | 343/18 E |
| 3,764,213 | 10/1973 | O'Meara | 356/5 |

Primary Examiner—Stephen C. Buczinski

Attorney, Agent, or Firm—L. Lee Humphries; H. Fredrick Hamann; Rolf M. Pitts

[57] ABSTRACT

A coherent optical adaptive system employs phase conjugation for locking the beam of a phased array of laser transmitter to a target, focusing the beam on the target and compensating for distortion and disturbances both within the system and in the propagating medium between the system and the target. A first diffraction-limited lobe of the beam is locked on a real target to track the real target. Simultaneously a second diffraction-limited lobe is directed to a location having a predetermined offset with respect to the target and relative energy of the two lobes is selectively adjusted. A signal component representing a fictitious target that is offset by a predetermined amount from the real target is summed with the signal received from the real target, the phase of the sum is compared with the phase of a reference, and the phase of the transmitted signal is adjusted so as to null the difference between the sum and the reference phases for each of a number of channels.

18 Claims, 3 Drawing Figures

(a) F=0

(b) F=0.2

(c) F=0.4

(d) F=0.6

(e) F=0.8

(f) F=1.0

SHARED POINTING FOR OFFSET TARGET OF AN ADAPTIVE PHASED ARRAY

The invention herein described was made in the course of or under a contract or subcontract thereunder with the United States Army.

BACKGROUND OF THE INVENTION

This invention relates to self-phasing electromagnetic energy arrays and more particularly concerns a coherent optical adaptive system and method of operation.

Self-phasing laser arrays, broadly described as coherent optical adaptive systems, receive their phasing information from the target itself and focus a relatively narrow beam upon a target that may be readily tracked by the array. In addition to the small width of the focused beam, significant advantages of coherent optical adaptive techniques include compensation for perturbations induced by both the beam propagating medium and factors within the transmission system itself. In these adaptive systems a multi-element or multi-aperture transmitting and receiving array is employed to sample the relative phasing or phase distribution of a wave received from a reflecting target. The phases of received signals are measured and an adapted wave is transmitted from the array elements having a phase that is adjusted in accordance with the measured phase so as to compensate for perturbations and focus an energy lobe on the target. In effect, the adaptive phased array receives a wave reflected from the target and which is distorted in shape because of the intervening turbulence, blooming, vibrations and other disturbances in the propagating medium. The system transmits a wave that is predistorted in such a way that it will be focused on a reflecting target after again passing through the intervening propagating medium. The predistortion, or correction, of the transmitted wave to compensate for intervening perturbations varies with time since the perturbations themselves vary with time, and thus the system is termed an adaptive phased array.

Among several different arrangements for implementing an adaptive phased array are the multidither systems and the phase conjugation systems.

A multidither system is described in "Coherent Optical Adaptive Techniques" by Bridges, Brunner, Lazzara, Nussmeier, O'Meara, Sanguinet and Brown, Jr. in *Applied Optics*, Vol. 13, No. 2, February, 1974, pages 291–300. In the multidither system a time-varying phase disturbance is introduced to move the fringe pattern transversely and a servo loop is employed to control a transmitter phase shifter to position the transmitted beam symmetrically upon the reflecting target.

In phase conjugation adaptive phased arrays, the phase distribution of the wave reflected from the target as received at the several elements or apertures of the array is measured by an array of heterodyne receivers employing a local oscillator as a phase reference. The signals transmitted from each element of the array are then phase adjusted so as to have a phase which is the phase conjugate of the phase of the signal received at respective elements. This phase conjugation of the signal transmitted from each of the array elements produces a diffraction-limited beam focused on the reflecting target and compensated for perturbations and disturbances, both in the propagating medium and within the system. A phase conjugation adaptive system of this type is disclosed in a copending application of Cecil L. Hayes and Walter C. Davis, Ser. No. 398,282, filed Sept. 17, 1973, entitled "Self-Compensating Interferometer". This application of Cecil L. Hayes et al is a continuation-in-part of application Ser. No. 282,621, filed Aug. 21, 1972 by Cecil L. Hayes et al and entitled "Self-Compensating Interferometer". Both of these patent applications of Hayes et al are assigned to the assignee of the present invention and the disclosures of both of these applications are incorporated herein by this reference as though fully set forth.

Adaptive phasing techniques have important applications in the fields of optical radar, communications and high-energy beam power delivery to remote targets. In many of these applications it is desirable to offset the focused beam with respect to a bright reflecting target. Thus, the receiving station of a communication system may employ a bright reflector which is offset from the receiver itself so as to aid in locating and tracking of the receiving station by the transmitting station. In other applications it may be desirable to scan a target for identification or other purposes while the beam is locked on and continues to track the moving target. Further, it may be desired to offset the beam from the target because the energy of the beam may cause undesired changes in the glint (reflecting) point and change or considerably decrease its reflective qualities. Accordingly, several types of offset pointing techniques have been considered for adaptive phased arrays. These may be grouped as those that operate full time in the adaptive mode and those that operate only part time in the adaptive mode. In both of these groups, in phase conjugation systems, the received signal is compared with a reference that has been phase shifted by applying a phase slope bias across the array from aperture to aperture. The phase slope bias is combined with the reference with respect to which the phase of received signals is measured. It produces a diffraction-limited lobe of the transmitted beam that is angularly offset from a line between the array and the reflecting target. The real or reflecting target is defined herein as a glint or point on an object that reflects impinging energy and is distinguished from a simulated, fictitious or offset target that is a location on an object, which location may produce little or no reflection of impinging energy. In the time-shared method of offset pointing, the normal phase conjugation process, that is, the basic adaptive technique without phase slope bias, is time shared with the offset pointing technique and the two steps are repeated cyclically. Thus, during the normal phase conjugation step of the two-step cycle, the transmitter phases are adapted and will retain focus of the beam upon the reflecting target. On the other hand, during the offset part of the cycle, the transmitter phases are not adapted and accordingly, the beam may defocus or wander due to time-varying system and atmospheric disturbing parameters.

In continuously adapted methods, phase conjugation is applied to the return from the offset beam. However, in general a smaller or weaker signal is available when the beam is offset because the main diffraction lobe remains incident on the offset target and the latter is assumed to have a small or negligible reflectivity. The return from the offset beam (illuminating both reflecting and offset targets) in this continuously adapted offset pointing technique is conjugated and retransmitted each time with the same phase slope bias and thus locks the offset beam to the glint point or reflecting target. However, since the adaptive phase conjugation of the transmitted beam is based upon a signal received from the reflecting target, this continuous offset pointing technique may exhibit severe instability. If a relatively large amount of energy is reflected from the offset target, as compared with the energy reflected from the reflecting target (the target upon which the adapted beam is desired to be locked), the normal adaption process may be disturbed and the beam may wander to lock either on an adjoining less reflective target or upon the offset target itself. Thus, the time-shared offset pointing may readily defocus or wander and the continuous offset pointing is relatively unstable. Accordingly, it is an object of the present invention to provide a continuously adaptive track and offset operation in an adaptive phased array that avoids or minimizes these disadvantages.

SUMMARY OF THE INVENTION

In carrying out principles of the present invention in accordance with a preferred embodiment, an adaptive phased array receives a wave from a real reflecting target, measures the relative phasing of the wave over the array and transmits an adapted wave having a phase that is adjusted partly in accordance with a measured phase so as to focus a first energy lobe on the target and to compensate for perturbations in the energy transmission path. The transmitted beam is caused to have a second lobe, offset from the first lobe, by combining fictitious target signal components with real target signal components received by the array and adjusting the phase of the transmitted wave in accordance with the phase of the combined components. In an embodiment of the invention employing phase conjugation, the output of a phase comparator in each channel of a multi-channel system is employed to operate a frequency or phase controller that shifts the phase of the signal transmitted from an array aperture of the respective channel in such a sense as to null the phase difference between the phase comparator inputs. A first input to all phase comparators is derived from a reference signal generator or reference channel and a second input to each phase comparator comprises the sum of a real target signal component representing the signal received at a respective aperture of the array and a fictitious target signal component representing a signal that would be received at the array aperture if there were a reflecting target at a location offset from the real target by a predetermined amount. Relative energy in the two lobes is readily controlled.

DETAILED DESCRIPTION

Figure 1:
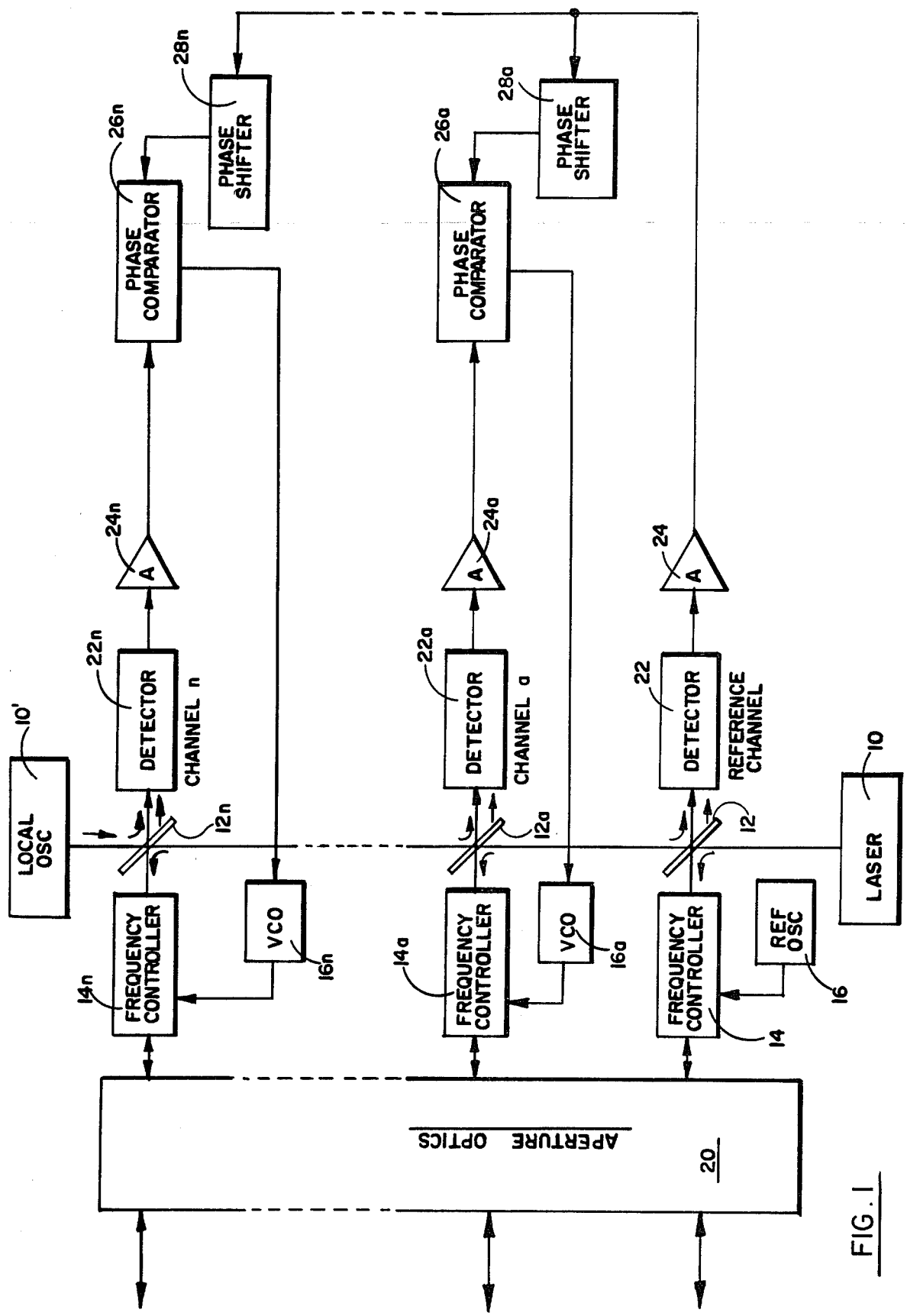
FIG. 1 illustrates a prior art adaptive phased array with the addition of offset pointing means.

Illustrated in FIG. 1 is an interferometer type or multi-channel electromagnetic energy system, here shown as a multi-channel laser system, that is adapted to transmit electromagnetic energy to a target and receive electromagnetic energy reflected from the target. The system includes transmitting and receiving channels which may be of any selected number such as six, twelve or more, each of which is identical to each other, except for the first channel which is employed as a reference channel. Thus the system includes a reference channel and channels a-n, where n is any selected number. The system illustrated in FIG. 1 is a modification of the system described in the above-identified copending application of Cecil L. Hayes et al for Self-Compensating Interferometer. Details of the basic multi-channel interferometer system (without offset pointing) are found in the disclosure of such copending patent application. This system, without the phase shifters for offset pointing, is further described in full detail in a Final Technical Report No. RADC-TR-73-95 dated February 1973, prepared by North American Rockwell Electronics Group Research Division for the Rome Air Development Center, Air Force Systems Command, Griffiss Air Force Base, New York and sponsored by the Defense Advanced Research Projects Agency, ARPA Order No. 1279, Amendment 5, which report has been approved for public release, distribution unlimited. Briefly, the system includes an array of apertures (transmitting and receiving elements) generally designated as aperture optics 20 which may include an array of mutually spaced telescopes, forming one extremity of the respective channels, to provide for transmission and reception of the electromagnetic energy beam of this adaptive phased system. The several channels are arranged to transmit optical energy provided from a laser transmitter 10 and reflected toward the respective aperture optics by respective beamsplitters 12, 12a–12n. The energy from the laser 10 is reflected along parallel optical paths to the respective apertures via frequency controllers or frequency shifters 14, 14a–14n. Each frequency controller is under control of a respective one of a plurality of oscillators comprising a reference oscillator 16 for the reference channel and voltage controlled oscillators 16a–16n for each of the other channels, respectively.

A local optical frequency oscillator such as a laser 10' provides an optical reference frequency beam that is coaxial with the beam of laser 10 and is reflected by each of the beamsplitters 12, 12a–12n to the respective detectors, 22, 22a–22n which form another extremity of the respective channels. The detectors also receive target signal components reflected from a real target, collected by the respective optical apertures and thence transmitted through the respective frequency controllers and beamsplitters. Thus, the system provides mutually oppositely and coaxially disposed first and second like electromagnetic energy generators having a common optical axis that is perpendicular to the mutually parallel optical channels through the frequency controllers.

The detectors provided a beat frequency output (the difference between the received signal and the local laser oscillator signal) to a plurality of amplifiers, respectively identified as 24, 24a–24n, which in turn provide a first input to phase comparators 26a–n in all but the reference channel.

Phase shifters 28a–28n are interposed between the reference channel amplifier 24 and the respective phase comparators for shifting the phase reference to accomplish offset pointing as will be more particularly described below. However, the operation of the system will first be described without offset pointing, temporarily considering phase shifters 28a–28n to be omitted and the reference to be fed directly to the respective comparators. Each of the phase comparators or phase detectors 26a–26n receives a reference signal from amplifier 24 of the reference channel (assuming the phase shifters to be omitted). The output of the phase comparators of each of channels a-n, respectively, are fed to the respective channel voltage controlled oscillators to control, in turn, the frequency controllers 14a-14n, respectively.

In operation of the described system, a beam of frequency $\omega_o$ from laser 10 is transmitted to and reflected by each of the beamsplitters 12, 12a-12n, to and through the respective frequency controllers, and thence to and through the respective apertures of the array. The several frequency controllers or frequency shifters impose a frequency shift of $\frac{1}{2}\omega_{IF}$ upon the frequency $\omega_o$ of the laser transmitter 10, and it is this frequency, $\omega_o + \frac{1}{2}\omega_{IF}$ that is transmitted. In this adaptive phased array, the function of the frequency controllers is to adjust the phase of the transmitted signal and thus these also may be termed "phase shifters". Such devices may take the form specifically described in the above-identified copending patent application of Cecil L. Hayes et al. They may comprise a well-known form of acousto-optic modulator operating in the Bragg angle mode. In such a device an acoustic wave propagating medium, such as germanium, interacts with the laser radiation to impose upon it a doppler shift corresponding to a sonic driving frequency imposed upon the propagating medium. By varying the frequency of the acoustic driving wave, phase modulation is achieved. As an example, such an acoustic optic Bragg cell functioning as a frequency modulator will transmit a laser frequency, such as a 10.6 micron wavelength, and may be driven at an acoustic frequency centered upon about 18 MHz, which results, upon detection, in an intermediate frequency of about 4.5 MHz.

Since each of the voltage control oscillators 16a-16n may be controlled by different signals, the frequency shift and therefore the phase shift imposed upon the signal that is transmitted by respective apertures will vary from channel to channel in accordance with the controlling input to the voltage controlled oscillator of the respective channel.

Upon radiation of the frequency translated carrier ($\omega_o + \frac{1}{2}\omega_{IF}$) from the system apertures and illumination of a target thereby, reflections from the target at a frequency of ($\omega_r + \frac{1}{2}\omega_{IF}$) are returned to the respective apertures and then propagated through the frequency controllers 14, 14a-14n. The carrier frequency of the received reflections from the target may differ from that of the transmitted carrier by the amount of any doppler shift that is induced by the radial motion of the target relative to the system apertures, but this doppler shift does not affect the operation of the present invention.

Upon propagation of the received signals from the respective optical apertures through the frequency controllers, the carrier frequencies thereof are again shifted by an additional amount of $\frac{1}{2}\omega_{IF}$ (the exact amount being dependent upon the nature of the signal provided from the controlling oscillator) and thus the carrier frequency that is fed from the respective frequency controllers to the detectors is $\omega_r + \omega_{IF}$. The detectors also receive the local oscillator signal frequency $\omega_o$ from the laser oscillator 10' as reflected by each of the beamsplitters. The nonlinear action of the detectors provides the difference frequency between the inputs thereto which is fed via the respective amplifiers to provide a system reference at an output of amplifier 24 for the reference channel, and to provide a first input to the respective phase comparators 26 and 26a-26n for the other channels. Each of the phase detectors provides an output comprising a measurement of the phase of the signal received and detected by the respective detectors, as compared with the phase of the reference signal provided by the reference channel. The output of the respective phase comparators is fed to control the voltage control oscillators 16a-16n to cause them to modulate the intermediate frequency shift imposed upon the laser beam. The modulation is in such a sense as to reduce the phase difference between the signals fed to the phase comparator. In other words, each channel comprises a phase loop that adjusts the amount of phase shift provided by the phase shifters or frequency controllers 14a-n in such a sense as to tend to null the difference between the two inputs to the phase comparator.

With the phase shift that is produced by the controllers 14a-14n adjusted in a sense to null the output of the phase comparators, the conjugate of the received wave at each aperture is transmitted to the target. It is this operation of the phase difference nulling loop comprising frequency controller (or phase shifter), phase comparator, reference channel and voltage control oscillator, that provides for the self-phasing of the array and automatically adapts the relative phases of signals transmitted from the respective apertures of the array so as to transmit signals having phases that are the respective conjugates of the phases of received signals.

The phase conjugation system described above will produce a spherically converging wave on the real target, the point from which reflected radiation is received by the array apertures, no matter where the target is located within the array field of view. Therefore, the system also functions both as a target-locating device and as a target-tracking device. The adaption process described above, that is, the adjustment of the relative phases of transmitted signals in accordance with the relative phases of the received signals, will lock the system onto the target automatically, always focusing the transmitted wave upon a target and compensating for disturbances in the propagation path.

PRIOR TRACK AND OFFSET OPERATION

The above-described adaptive phased array, of the type shown in the above-identified copending patent application of Hayes et al, may be operated in a track and offset mode (offset pointing) by applying a phase correction $\Phi_n$ to a typical transmitter aperture, which correction is defined by $$\Phi_n = \phi_n + \beta X_n/s \qquad \text{Equation (1)}$$

where $\phi_n$ is the phase conjugate of the phase of the received signal component at receiving aperture n of the array, $\beta/s$ is the phase gradient bias for a given offset of the transmitted beam, s is the center-to-center phasing of adjacent transmitter apertures of the array, and $X_n$ is the position of the center of aperture n from a given point on the array.

Application of the phase correction $\Phi_n$ to each aperture of the array results in a diffraction-limited beam focused on a target that is offset from the glint point, the reflecting target, by an angle $\alpha$ where $$\alpha = (\beta/2\pi)(\lambda/s) \qquad \text{Equation (2)}$$

Here $\lambda$ is the wavelength of the laser radiation (of frequency $\omega_o + \frac{1}{2}\omega_{IF}$ in the above-described example). The maximum angle that a beam may be offset before the intensity pattern repeats itself is $\lambda/s$ wherefore the pointing range of a phased array is restricted to $\pm\frac{1}{2}\lambda/s$. The beam can be scanned by allowing $\beta$ in equation (1) to vary with time so that a linear scan would employ a value of $\beta$ as follows:

$$\beta = \beta_o + \beta_1 t \qquad \text{Equation (3)}$$

where $\beta_o$ and $\beta_1$ are constants and t is time.

In offset beam pointing as described above, the received signal component is conjugated for each array aperture just as in the normal (without offset pointing) operation of the adaptive phased array and in addition, a phase correction of magnitude $\beta X_n/s$ is applied to the signal transmitted from such aperture. Thus, the phase conjugation is still based entirely on the received signal component at the respective apertures, that is, it depends upon the term $\phi_n$ of equation (1), which is the phase conjugate of the received signal.

The phase correction $\Phi_n$ is achieved by modifying the operation of the normal adaptive phased array by employing a separate phase shifter $28a-28n$ for each channel other than the reference channel. Accordingly, all of the received signal components are compared in the respective phase comparators with a signal from the reference channel that has been phase shifted by an amount determined by the phase bias slope according to the position of the particular array aperture.

Each of the phase shifters shifts the signal from the reference signal generator by a phase angle equal to $\beta X_n/s$. It is with this phase shifted reference signal that the received target signal components are compared for the above-described offset pointing. If the compared phases are unequal, the difference is used to drive the frequency controllers $14a-14n$ via the voltage controlled oscillators $16a-16n$ until the output of the phase comparators indicate that the phases being compared are equal. This automatically sets the frequency controller so as to adjust the phases of the respective transmitted signals to transmit the conjugate of the received signal component having a fixed-phase bias (which is not conjugated).

As previously noted, the above-described track and offset mode is subject to significant instabilities. The main diffraction lobe of the offset beam is incident upon the offset target which may have negligible reflectivity, while energy reflected from the glint point, that is, energy actually reflected from the real target and received by the array, is employed in the conjugation and pointing processes. Therefore, reflected energy returning to the array may not be strong enough for the adaption process. Fluctuation of intensity level or other instability may occur if sufficient light is reflected from the offset target (where the major diffraction lobe of the offset beam is focused) to interfere with the normal adaption process.

If the offset angle is greater than $\lambda/D$, where D is the total length of an assumed one-dimensional array, the return from a weak glint or reflecting target that is near the primary reflecting target, a bright glint, may exceed that from the primary target. When this occurs, the phased array may attempt to lock and offset with respect to the weaker glint. Instability therefore occurs as the diffraction pattern wanders or breaks into different components each associated with a different glint in the target plane. Stable operation of such an arrangement can occur only if the energy reflected from the bright or primary glint point dominates the return beam.

SHARED POINTING FOR OFFSET TARGET

According to the present invention, a continuously adaptive track and offset operation of an adaptive phased array is achieved without the instabilities of the above-described offset pointing techniques by employing adaptive techniques to focus a second lobe of the transmitted beam upon a fictitious target that is offset from the real target while concomitantly employing adaptive techniques to focus a first lobe of the beam upon the real target. Thus, a fictitious target signal component is electronically generated to simulate a signal that would be received from a fictitious target that is offset from the real or actually reflecting target. The fictitious target signal component is combined with the target signal component indicative of the real target and received by the array. The sum of these two components (for each channel other than the reference channel) has its phase compared with the reference phase (from a reference signal generator or from the reference channel). Results of the phase comparison are employed in the normal adaption process so that there is transmitted from the respective apertures of the array a signal having a phase that is the phase conjugate of the sum of a real target signal component and a fictitious target signal component. Accordingly, the transmitted beam will provide two major energy lobes on the target, a first lobe focused at the real or reflecting target and a second lobe focused at a predetermined offset from the real target, the location of the fictitious or simulated target. Relative intensities of the two lobes at the real target, or glint, and at the fictitious target location may be readily controlled by relative adjustment of the amplitudes of the two signal components that are combined for phase comparison with the reference signal.

Figure 2:
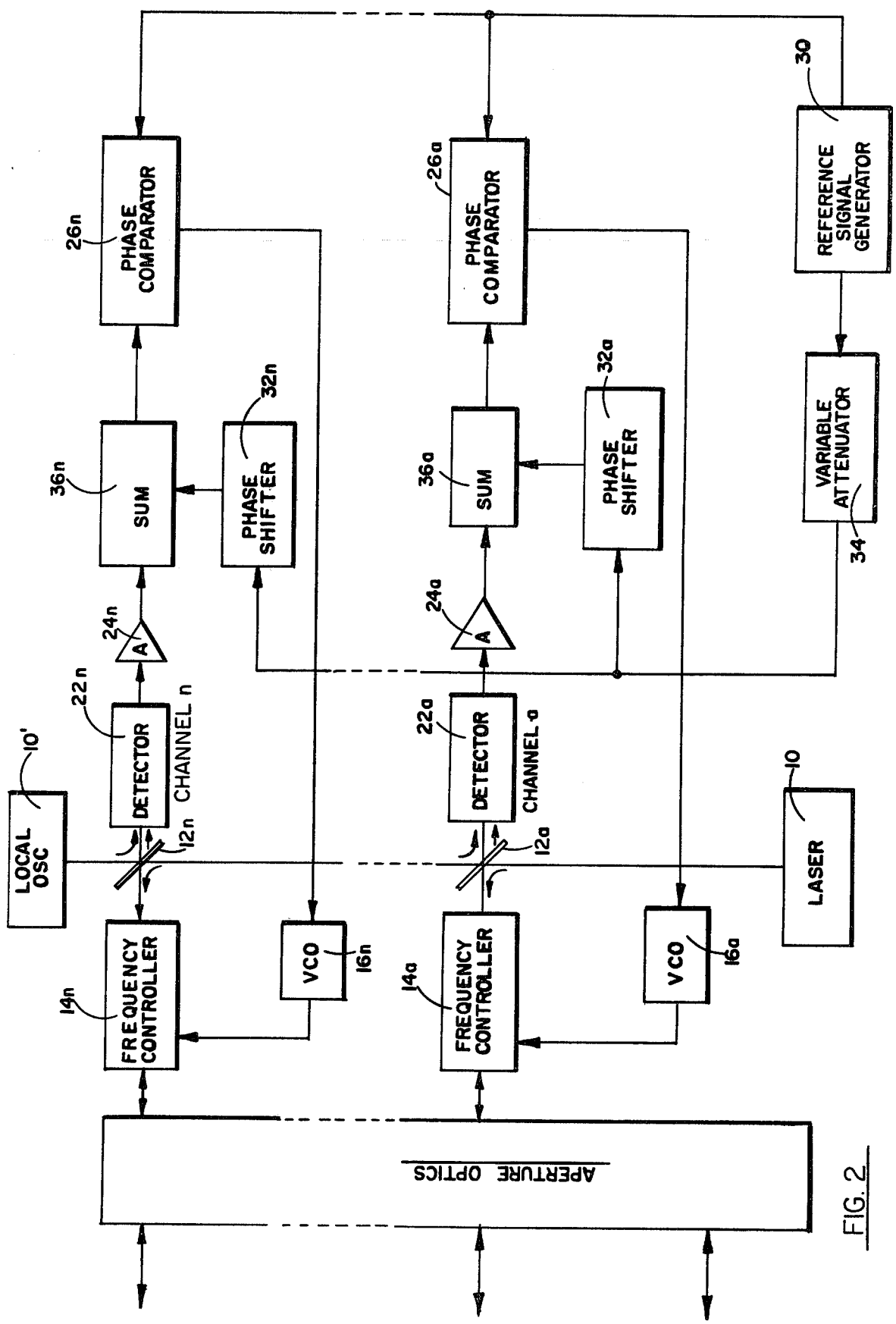
FIG. 2 is a block diagram of an embodiment of the present invention.

A block diagram of an exemplary system for practicing this shared pointing for an offset target is illustrated in FIG. 2 wherein the reference channel of the phase conjugate adaptive phased array system of FIG. 1 is illustrated as a reference signal generator 30. The system of FIG. 2 includes an array of transmitting and receiving aperture optics 20, laser transmitter 10, local oscillator 10', and a plurality of channels $a-n$ including frequency controllers $14a-14n$, voltage controlled oscillators $16a-16n$, beamsplitters $12a-12n$, detectors $22a-22n$, amplifiers $24a-24n$ and phase comparators $26a-26n$, all constructed and arranged just the same as the similar elements, identified by like reference numerals of the system of FIG. 1. In the system of FIG. 2, however, phase shifters $28a-28n$ that are employed in the prior system (FIG. 1) to phase shift the reference used for phase comparison are omitted.

A fictitious target signal component, in each channel, is generated by phase shifters $32a-32n$, respectively, all having inputs from a common variable attenuator 34 and providing phase shifted and attenuated components, derived from the reference signal generator 30, to respective summing circuits $36a-36n$. The attenuator has an input from the reference signal generator (reference channel) which also provides the reference input to all comparators. A second input to each of the summing circuits comprises the real target signal component representing the signal reflected from the target, received at the array and then propagated through the frequency controller, detector and amplifier of the respective receiver channels. Thus, the phase comparison takes place between the reference signal produced by the reference signal generator 30 and the sum of two signal components. The phase comparator operates as in the normal phase conjugate adaptive system described in connection with FIG. 1 to produce an output that causes the voltage controlled oscillators of the respective channels to adjust the phase of the signal transmitted so that the phases of the two signals fed to the comparator tend to be equal.

This operation results in transmission from the respective array apertures of signals having a phase that is the conjugate of the phase of the sum of the real target signal component and the fictitious target signal component. It does not simply add a bias to a transmitted conjugate of the real target signal, as in the prior offset pointing technique. Accordingly, the adaption process occurs on both components and the transmitted beam focuses and locks upon both the real target and the fictitious target offset from the real target.

To understand operation of the shared pointing offset technique of FIG. 2, we may consider the system as causing the bright glint or primary reflecting target to be made the dominant component of the reflected wave even though a substantial amount of energy of the beam is offset. This is achieved by focusing a diffraction-limited lobe on both the primary reflecting target point as well as on the offset target. It will be recalled that in the prior track and offset beam pointing process, as described in connection with FIG. 1, the transmitted beam is adapted only upon the energy received from the primary reflecting target, although a major energy lobe is directed at an offset point. The system of FIG. 2, however, insures the focusing of a significant, but adjustable, energy lobe upon the real target, the brighter glint point. This is achieved by electronically creating a fictitious glint or fictitious target at a point that is offset from the real target by a predetermined amount. A selected relative magnitude of the complex amplitude of the electronically created fictitious wave reflected from the fictitious target is added to the wave reflected from the real target. Since the phase conjugation adaptive phased array may be considered to be a reimaging method, it operates to refocus energy simultaneously on both the real and fictitious targets in the target plane.

The wave reflected from the real target (the bright glint) and detected by the receiver aperture of channel n may be represented by the expression $A_n \sin(\omega t + \phi'_n)$, where $\phi'_n$ in phase of the received wave at aperture n, and $A_n$ is amplitude. In the system of FIG. 2, where $\omega_o$ is the local laser oscillator frequency, $\omega_r$ is the frequency of the received signal and $\omega_{IF}$ is the intermediate frequency, the frequency $\omega$ in the above expression is equal to $\omega_r + \omega_{IF} - \omega_o$.

It can be shown that a fictitious target, assumed to be offset by an angle $\alpha$ from the real target may be represented by a wave received at the array aperture n having the form $B_n \sin(\omega t + \phi'_n + \beta X_n/s)$, where the frequency $\omega$ is the same as that of the real target signal component and the other terms are as previously defined. $B_n$ is amplitude of the fictitious returning wave.

Because only the relative values of the amplitudes $A_n$ and $B_n$ are of significance, the sum of the real target signal component and the fictitious target signal component can be written as $$C_n \sin(\omega t + \Phi'_n) = F \sin(\omega t + \phi'_n) + (1-F) \sin(\omega t + \phi'_n + \beta X_n/s).$$  Equation (4)

In equation (4) the quantity F is the fraction of the sum reflected by the real target and (1−F) is the fraction assumed to be reflected by the fictitious offset target. The resultant of the two reflections, the real reflection and the fictitious reflection, is a wave of amplitude $C_n$ and phase $\Phi'_n$ presumably received at the receiver aperture n. In the shared pointing offset technique, employing solely phase adaption, a wave having the conjugate of phase $\Phi'_n$, which is the conjugate phase $\Phi_n$, is retransmitted with no change in transmitter amplitude. It may be noted that the shared pointing offset technique described herein may also be operated in both phase and amplitude adaption mode by adjusting each transmitter amplitude to be proportional to the quantity $C_n$. However, a phase-only adaption process is preferred because it is simpler to implement and will result in more energy being focused at the target plane.

Accordingly, in the system shown in FIG. 2, a real target signal component which appears at the output of amplifier 24n of channel n is a signal of the form $A_n \sin[(\omega_r + \omega_{IF} - \omega_o)t + \phi'_n]$. The signal from the reference signal generator (which may be a reference channel, just as shown in FIG. 1) may take the form $R \sin[(\omega_r - \omega_o + \omega_{IF})t + \phi_{IF}]$, where R is a constant representing amplitude. This signal is fed as a reference to each of the phase comparators 26a–26n. It is also fed to the variable attenuator 34 and thence to the respective phase shifters 32a–32n of the several channels of the system.

The output of the respective phase shifters 32a–32n is the electronically generated fictitious target signal component of the form $B_n \sin[(\omega_r + \omega_{IF} - \omega_o)t + \phi'_n + \beta X_n/s]$. These two complex waves are added in the respective summing circuits 36a–36n and fed as the second inputs of the respective channel phase comparators 26a–26n. If the phases of the two inputs to the respective comparators are unequal, the difference is used to drive the respective frequency controllers via the voltage controlled oscillators so that the phases are equal. This automatically sets the frequency controller and adjusts the phase of the transmitted wave so that a diffraction-limited image of the real target is focused upon the real target and a diffraction-limited image of the fictitious target is focused upon the fictitious offset target. The relative intensities of the two diffraction lobes so obtained are controlled by adjustment of the variable attenuator 34.

Figure 3:
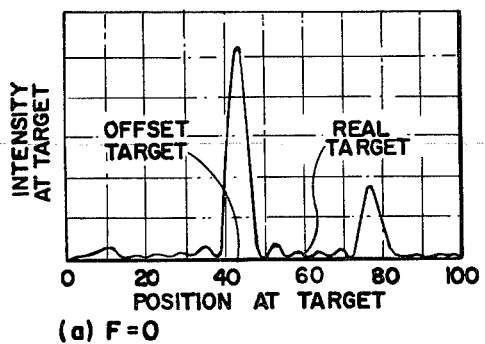
FIGS. 3a through 3f are graphs illustrating intensity distribution of energy at the target of a six-element array employing continuously adaptive track and offset techniques of the present invention.
Figure 3:
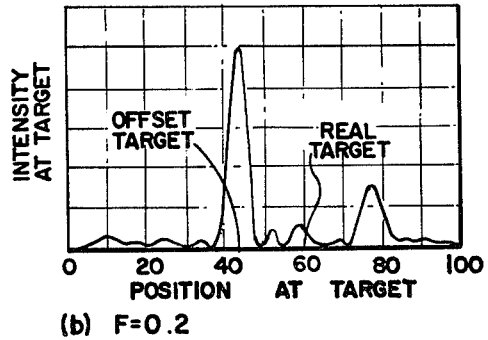
Figure 3:
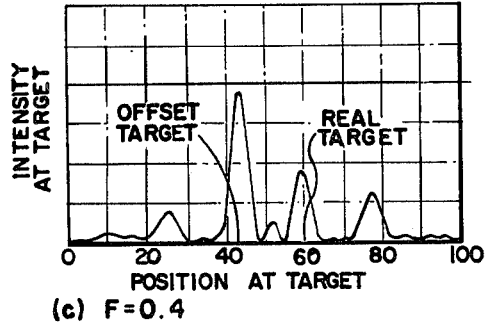
Figure 3:
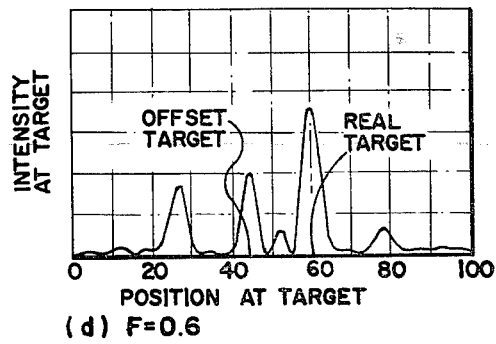
Figure 3:
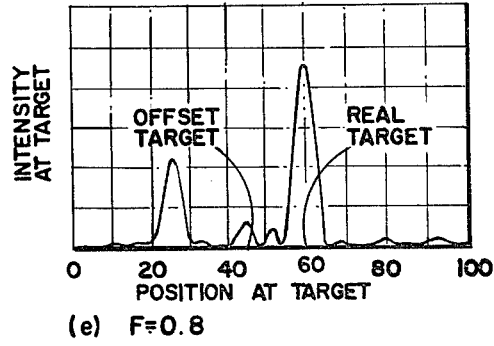
Figure 3:
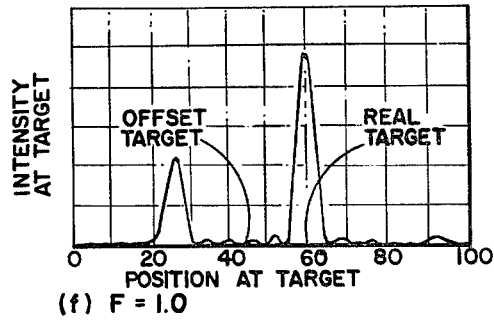

Illustrated in FIG. 3 are graphs of intensity distribution of the above-described shared pointing of a six-element array for a target offset by $3\lambda/D$ with respect to a real target that is located 10 cm to the right of the center of the abscissa of the graph. In these graphs the abscissa represents position or distance in centimeters in the target plane and the ordinate represents intensity of the energy impinging upon the target, in arbitrary units. The small circle represents the real target and the small downwardly directed arrow represents the simulated or fictitious target. FIG. 3a shows the intensity distribution where the quantity F of equation (4) equals 0. In this condition, as may be seen from inspection of equation (4), all of the energy of the beam is directed at the offset target, as represented by the high intensity energy lobe 50. Very little energy impinges upon the real target point.

In FIG. 3b the relative intensity factor F is equal to 0.2. In FIG. 3c, F is equal to 0.4. In FIG. 3d, F equals 0.6. In FIG. 3e, F equals 0.8 and in FIG. 3f, F equals 1.0. It will be seen that as the relative intensity factor F is increased from zero the diffraction-limited lobe 50 that is focused upon the fictitious target decreases in amplitude and in energy content and a second diffraction-limited lobe 52 increases in amplitude and energy content. The lobe 52 is positioned at the real target. Where F equals one, the fictitious target signal component is zero and the system operates without offset pointing, focusing all of the energy of the main lobe 52 upon the real target.

FIG. 3 graphically illustrates the fact that the relative intensities of the lobe that is focused upon the real target and the lobe that is focused upon the fictitious target are easily controlled.

From inspection of the graphs of FIG. 3 it will be seen that a lobe of controlled intensity can be focused upon a real target by means of the system illustrated in FIG. 2 while simultaneously focusing a lobe, also of controlled intensity, upon a simulated target that is offset from the real target.

For targets having but a single glint or reflecting point, the shared pointing offset technique of FIG. 2 will improve the receiver signal-to-noise ratio in offset pointing. Where the target area has a plurality of reflecting points or multiple glints, the above-described system of FIG. 2 is essential for achieving stable operation at offset angles greater than $\lambda/D$.

For a real target that is highly reflective, the relative amplitudes of the two lobes may be adjusted to focus a greater amount of energy upon the fictitious target, transmitting relatively small amounts of energy to the real target. On the other hand, should the real target be of relatively low reflectivity, the energy directed thereto may be readily increased by adjustment of the variable attenuator so as to insure that an adequate amount of energy is reflected from the real target to actuate the adaptive process.

In the system of FIG. 2, phase shifters 32a-32n are adjusted to add a phase angle $\phi'_n + \beta X_n/s$ to the attenuated signal derived from the reference signal generator 30. Each of the phase shifters is adjusted to achieve the desired amount of phase shift. The system may also be operated to provide a first diffraction-limited lobe that remains focused upon the real target while a second diffraction-limited lobe, which is directed at the simulated or fictitious target, is caused to scan the target area. That is, the second lobe will move with respect to the first lobe. This function may be readily achieved by varying the amount of phase shift produced by the respective phase shifters so that the quantity $\beta$ in the phase shift angle $(\phi'_n + \beta X_n/s)$ is caused to be equal to $\beta_o + \beta_1 t$ where $\beta_o$ and $\beta_1$ are fixed. Thus, the system may be caused to lock upon a moving real target and yet continue to scan over the area of the target, relative to the real target, to provide additional information.

A preferred form of the present invention has been described as implemented in a phase conjugation adaptive system, but it will be readily appreciated that principles of the invention are readily applicable to other adaptive systems such as, for example, the multidither system of the above-identified article entitle "Coherent Optical Adaptive Techniques" in *Applied Optics*.

By adding still other electronically generated fictitious target signal components produced by additional phase shifters and all combined in a single summing network that provides an input to the respective phase comparators (for each channel), principles of shared pointing of an offset target described herein can be readily extended to focus several diffraction-limited lobes respectively on more than one fictitious offset target.

There have been described methods and apparatus for the controlled pointing and focusing of a plurality of diffraction-limited lobes of an adaptive phased array upon a real target and upon one or more fictitious targets offset from the real target to thereby provide improved offset pointing stability and additional functions not previously available.

The foregoing detailed description is to be clearly understood as given by way of illustration and example only, the spirit and scope of this invention being limited solely by the appended claims.

What is claimed is:

1. In a coherent optical adaptive target tracking system wherein the phase of a wave received from a reflecting target is measured at a receiver and an adapted wave is transmitted having a phase that is adjusted in accordance with said measured phase to focus a first energy lobe on said target and to compensate for perturbations in the energy transmission path including distortion caused by the propagating medium between said target and the system, the improvement comprising
    means for generating a fictitious target signal component that simulates a wave reflected from a fictitious target that is offset by a predetermined amount from said reflecting target,
    means for combining said fictitious target signal component with a real target signal component representing the received wave reflected from said reflecting target, and
    means for adjusting the phase of the transmitted wave in accordance with the phase of the combined fictitious and real target signal components, whereby a second lobe of the transmitted wave is focused at the location of said fictitious target.

2. The improvement of claim 1 including means for adjusting the relative energy in said first and second lobes.

3. The improvement of claim 2 wherein said means for adjusting relative energy comprises means for adjusting the relative amplitudes of said fictitious and real target signal components.

4. The improvement of claim 1 wherein said means for adjusting the phase of the transmitted wave comprises phase controlling means operable upon the transmitted wave, and phase comparator means responsive to a reference and to said combined fictitious and real target signal components for operating said phase controlling means.

5. The improvement of claim 4 wherein said means for generating said fictitious target signal component comprises phase shifting means responsive to said reference, and wherein said means for combining signal components comprises a summing circuit responsive to said real target signal component and to said phase shifting means for providing a first input to said phase comparator means, said reference comprising a second input to said phase comparator means.

6. The improvement of claim 5 including means for adjusting the relative energy in said first and second lobes, said last-mentioned means comprising means for selectively varying the amplitude of the signal component produced by said phase shifting means.

7. A multi-channel electromagnetic energy target tracking system comprising
   an array of transmitting-receiving elements for respectively receiving signals representing a wave reflected from a real target and for transmitting signals toward said target, said received signals having relative phases representing shape of the reflected wave as distorted by disturbances in the energy transmission path,
   adaptive means responsive to the relative phases of said received signals for transmitting from said array a plurality of signals having relative phases that are related to the relative phases of said received signals so as to compensate for said distorted shape of the reflected wave and to focus a first lobe of an energy beam transmitted by the array upon said real target, and
   means for focusing a second lobe of said energy beam upon a fictitious target offset from said real target, said means for focusing a second lobe comprising means for combining with each of the signals received from at least a group of said array elements a fictitious target component that simulates the signal that would be received from a fictitious target offset from said real target by a predetermined amount, and adjusting the relative phases of transmitted signals in accordance with the relative phases of said combined received signals and fictitious components, whereby signals transmitted from said array will have relative phases that focus a second lobe of said energy beam upon a point at the location of said fictitious target.

8. The system of claim 7 including means for adjusting the amplitude of said fictitious target component with respect to the signal with which it is combined to thereby adjust the relative energy in said first and second lobes.

9. The system of claim 7 wherein said adaptive means comprises a plurality of adaptive channels, each said channel including a respective one of said array elements and each comprising
   a phase controller for controlling phase of transmitted energy,
   a reference signal generator common to all channels,
   a phase comparator having a first input responsive to said reference signal generator, and having a second input, means responsive to said phase comparator for operating said controller in a sense to reduce the phase difference between the inputs to said comparator,
   said means for combining comprising a summing circuit having a first input from said phase controller, and having an output providing said second input to said comparator, and a phase shifter responsive to said reference signal generator and having an output providing a second input to said summing network.

10. The system of claim 9 including a selectively variable attenuator interposed between said reference signal generator and the phase shifter of each said channel.

11. The system of claim 9 wherein said first input to said summing circuit is a real target signal of the form $A_n \sin(\omega t) + \phi_n)$ and wherein said second input to said summing circuit is a fictitious target signal of the form $B_n \sin(\omega t) + \phi_n + \beta X_n/s)$ where $A_n$ and $B_n$ are constants, $\omega$ is angular velocity (frequency) of the signal, t is time, $\phi_n$ is the phase of the signal is channel n, s is the center-to-center spacing of adjacent elements of the array, $\beta/s$ is a phase gradient bias for angularly displacing the axis of the transmitted beam, and $X_n$ is the position of an element of the array.

12. A multi-channel electromagnetic energy system of a type having at least two substantially parallel channels, each of said channels having a first extremity comprising an aperture of said system and having a second extremity including a detector responsive to electromagnetic energy propagated toward said second extremity, said system further including in combination
   first and second like electromagnetic energy generators, first and second beamsplitters respectively disposed within the optical paths of said two channels, a first one of said generators cooperating with said beamsplitters as a transmitter of energy out of said apertures of said system and a second one of said generators cooperating with said beamsplitters as a local oscillator,
   a reference signal generator for generating a reference signal,
   phase-sensitive feedback modulation means respectively responsive to the phase difference between said reference signal and the outputs of respective ones of said detectors for compensatorily modulating respective channels in such sense as to reduce said phase difference, and
   means in each of said channels interposed between said detector and the input to said phase-sensitive feedback modulation means for combining with the output of the respective detectors a fictitious target signal component representing a detected signal received from a target offset from a real target of said system.

13. The system of claim 12 wherein said phase-sensitive feedback modulation means comprises, for each channel, a phase comparator having a reference input from said reference signal generator, and a phase controller responsive to said comparator for varying the phase of the energy transmitted from the respective channel, and wherein said means for combining a fictitious target signal comprises a phase shifter responsive to said reference signal generator and a summing circuit having inputs from said detector and from said signal shifter and having an output to said phase comparator.

14. The system of claim 13 including a variable attenuator interposed between said reference signal generator and each of said phase shifters.

15. A method of operating a coherent optical adaptive system in a continuously adaptive track and offset mode comprising the steps of
   employing an array of receiving and transmitting apertures to receive an optical wave reflected from a real target, producing real target signal components respectively representing signals received at different ones of said array apertures,
   generating a plurality of fictitious target signal components respectively representing signals received at the respective array apertures from a fictitious target that is offset by a predetermined amount from the said real target, combining the real target signal components respectively with corresponding fictitious target signal components, and employing the combined components to adjust the relative phases of a wave transmitted by the apertures of said array, whereby the transmitted wave includes a first energy lobe focused on the real target and a second energy lobe focused on the fictitious target, and whereby said transmitted wave is compensated for distortions caused by disturbances in the propagating medium between the system and said real target.

16. The method of operating a coherent optical adaptive system in a continuously adaptive track and offset mode comprising the steps of employing an array of transmitting and receiving optical energy beam apertures for sampling a wave reflected from a real target, where the relative phasing of the signals received at the apertures depends in part upon reflected wave shape as distorted by disturbances in the propagation path, providing a reference signal for use in measuring phase of signals sampled at each of the array apertures, measuring the relative phasing of the samples obtained at the array apertures, transmitting an optical wave from said apertures by means of a separate phase controller for each of the apertures, adjusting the phase controller of the respective apertures in a sense to null the phase difference between the sampled signal and the reference signal, generating a fictitious target signal component at the frequency of said reference signal and phase shifted relative thereto by an amount representing an offset of a fictitious target from said real target, and combining said fictitious target signal component with the sampled signal of a respective array aperture to provide the sampled signals having relative phasing that is measured to adjust said phase controllers.

17. In a coherent optical adaptive tracking system having an array or plurality of adaptively controlled transmit/receive apertures, for producing a substantially spherically converging wave front or main lobe on a reflective target tracked by said tracking system, means for selectively modifying the produced wave front to provide an auxiliary lobe which scans an auxiliary target area associated with said tracked reflective target and comprising signal summing means interposed in the receiver detector output stage of that respective receiver associated with each one of said controlled transmit/receive apertures, a like number of phase shift means as signal summing means, said phase shift means being commonly responsively coupled to an intermediate frequency reference signal generator of said tracking system, each of said phase shift means being output coupled to an input of a mutually exclusive one of said signal summing means.

18. The device of claim 17 in which said means for selectively modifying said wave front includes selectively adjustable signal attenuation means interposed at said common coupling of said phase shift means for selectively adjusting the common input thereto.

* * * * *